(12) United States Patent
Wang et al.

(10) Patent No.: US 10,732,819 B2
(45) Date of Patent: Aug. 4, 2020

(54) METHOD AND MOBILE TERMINAL FOR QUICKLY OPENING AN APPLICATION BASED ON LOCK SCREEN

(71) Applicant: Huizhou TCL Mobile Communication Co., Ltd, Huizhou, Guangdong (CN)

(72) Inventors: Bing Wang, Huizhou (CN); Xinyao Ye, Huizhou (CN); Ke Feng, Huizhou (CN); Yijun Lai, Huizhou (CN)

(73) Assignee: HUIZHOU TCL MOBILE COMMUNICATION CO., LTD., Huizhou (CN)

(*) Notice: Subject to any disclaimer, the term of this patent is extended or adjusted under 35 U.S.C. 154(b) by 202 days.

(21) Appl. No.: 15/546,661

(22) PCT Filed: Dec. 16, 2016

(86) PCT No.: PCT/CN2016/110364
§ 371 (c)(1),
(2) Date: Jul. 27, 2017

(87) PCT Pub. No.: WO2017/211062
PCT Pub. Date: Dec. 14, 2017

(65) Prior Publication Data
US 2018/0217732 A1 Aug. 2, 2018

(30) Foreign Application Priority Data
Jun. 7, 2016 (CN) .......................... 2016 1 0404372

(51) Int. Cl.
*G06F 3/0488* (2013.01)
*G06F 21/31* (2013.01)
(Continued)

(52) U.S. Cl.
CPC .......... *G06F 3/0488* (2013.01); *G06F 3/0482* (2013.01); *G06F 3/0484* (2013.01);
(Continued)

(58) Field of Classification Search
CPC .... G06F 3/0488; G06F 3/0417; G06F 3/0482; G06F 3/04842; G06F 3/04883; G06F 3/04886; G06F 21/31
See application file for complete search history.

(56) References Cited

U.S. PATENT DOCUMENTS 8,847,903 B2 * 9/2014 Stokes ................ G06F 3/04883
345/156
9,395,914 B2 * 7/2016 Chun .................. G06F 3/04886
(Continued)

FOREIGN PATENT DOCUMENTS

| CN | 102981763 A | 3/2013 |
|---|---|---|
| CN | 103176696 A | 6/2013 |

(Continued)

OTHER PUBLICATIONS

International Search Report on corresponding PCT application (PCT/CN2016/1110364) from International Searching Authority (CN) dated Mar. 16, 2016.

*Primary Examiner* — Kieu D Vu
*Assistant Examiner* — Rami R Okasha

(57) ABSTRACT

The present disclosure discloses a method and a mobile terminal for quickly opening an application based on a lock screen. The method includes: displaying a touch position on an area of a lock screen interface when a mobile terminal enters the lock screen; displaying a recently used application list after the touch position is detected to have been touched; and opening an application corresponding to an application icon of the application list after the application icon is selected.

16 Claims, 6 Drawing Sheets

(51) Int. Cl.
  *G06F 3/0482* (2013.01)
  *G06F 3/0484* (2013.01)
  *G06F 3/0481* (2013.01)
  *H04M 1/725* (2006.01)
  *G06F 1/16* (2006.01)
  *H04M 1/67* (2006.01)

(52) U.S. Cl.
  CPC ...... *G06F 3/04817* (2013.01); *G06F 3/04842* (2013.01); *G06F 3/04886* (2013.01); *G06F 21/31* (2013.01); *G06F 1/1643* (2013.01); *H04M 1/67* (2013.01); *H04M 1/72522* (2013.01); *H04M 2250/22* (2013.01)

(56) References Cited

U.S. PATENT DOCUMENTS

| | | | | |
|---|---|---|---|---|
| 9,619,139 B2* | 4/2017 | Wada | ............. | G06F 3/04883 |
| 2009/0183100 A1* | 7/2009 | Eom | ............. | G06F 3/0482 |
| | | | | 715/769 |
| 2010/0257490 A1* | 10/2010 | Lyon | ............. | G06F 3/0488 |
| | | | | 715/863 |
| 2010/0269040 A1* | 10/2010 | Lee | ............. | G06F 3/04817 |
| | | | | 715/702 |
| 2012/0046077 A1* | 2/2012 | Kim | ............. | H04M 1/72577 |
| | | | | 455/566 |
| 2012/0084734 A1* | 4/2012 | Wilairat | ............. | G06F 21/36 |
| | | | | 715/863 |
| 2012/0174042 A1* | 7/2012 | Chang | ............. | G06F 3/04883 |
| | | | | 715/863 |
| 2013/0055169 A1 | 2/2013 | Wright et al. | | |
| 2013/0086522 A1* | 4/2013 | Shimazu | ............. | G06F 3/0488 |
| | | | | 715/810 |
| 2013/0091468 A1* | 4/2013 | Xie | ............. | H04M 1/67 |
| | | | | 715/835 |
| 2013/0117705 A1* | 5/2013 | Ting | ............. | H04M 1/67 |
| | | | | 715/781 |
| 2013/0283212 A1* | 10/2013 | Zhu | ............. | G06F 3/0486 |
| | | | | 715/846 |
| 2013/0285925 A1* | 10/2013 | Stokes | ............. | G06F 3/04883 |
| | | | | 345/173 |
| 2013/0298024 A1* | 11/2013 | Rhee | ............. | G06F 21/31 |
| | | | | 715/716 |
| 2013/0326420 A1* | 12/2013 | Liu | ............. | G06F 3/0482 |
| | | | | 715/840 |
| 2014/0137049 A1* | 5/2014 | Jung | ............. | H04W 12/06 |
| | | | | 715/847 |
| 2014/0181964 A1* | 6/2014 | Park | ............. | G06F 21/6209 |
| | | | | 726/19 |
| 2014/0208269 A1* | 7/2014 | Boyana | ............. | H04M 1/66 |
| | | | | 715/835 |
| 2014/0258937 A1* | 9/2014 | Lee | ............. | G06F 3/0482 |
| | | | | 715/835 |
| 2014/0298268 A1* | 10/2014 | Kang | ............. | G06F 3/04847 |
| | | | | 715/841 |
| 2014/0365904 A1* | 12/2014 | Kim | ............. | G06F 3/0484 |
| | | | | 715/741 |
| 2015/0033361 A1* | 1/2015 | Choi | ............. | G06F 21/60 |
| | | | | 726/27 |
| 2015/0040214 A1* | 2/2015 | Gao | ............. | G06F 9/445 |
| | | | | 726/19 |
| 2015/0215444 A1* | 7/2015 | Tang | ............. | G06F 3/04883 |
| | | | | 455/411 |
| 2015/0278502 A1* | 10/2015 | Broms | ............. | G06F 21/36 |
| | | | | 707/783 |
| 2016/0044153 A1* | 2/2016 | Kim | ............. | H04M 1/72522 |
| | | | | 455/418 |
| 2016/0077606 A1* | 3/2016 | Hyun | ............. | G06F 3/14 |
| | | | | 345/156 |
| 2016/0378967 A1* | 12/2016 | Li | ............. | G06F 21/36 |
| | | | | 726/19 |
| 2017/0026574 A1* | 1/2017 | Kwon | ............. | H04N 5/23238 |
| 2017/0031542 A1* | 2/2017 | Ryu | ............. | G06F 3/04817 |
| 2018/0260545 A1* | 9/2018 | Chen | ............. | G06F 3/0488 |

FOREIGN PATENT DOCUMENTS

| | | |
|---|---|---|
| CN | 103543936 A | 1/2014 |
| CN | 104123097A A | 10/2014 |
| CN | 104573472 A | 4/2015 |

* cited by examiner

METHOD AND MOBILE TERMINAL FOR QUICKLY OPENING AN APPLICATION BASED ON LOCK SCREEN

CROSS-REFERENCE TO RELATED APPLICATIONS

The present application is a 35 U.S.C. § 371 National Phase conversion of International (PCT) Patent Application No. PCT/CN2016/110364 filed Dec. 16, 2016, which claims foreign priority of Chinese Patent Application No. 201610404372.X, filed on Jun. 7, 2016 in the State Intellectual Property Office of China, the contents of all of which are hereby incorporated by reference.

TECHNICAL FIELD

Embodiments of the present disclosure generally relate to mobile communication technology, and in particular relate to a method and a mobile terminal for quickly opening an application based on a lock screen.

BACKGROUND

With the rapid development of electronic technology and the extensive use of intelligent terminals, the functions of intelligent terminals are getting numerous, and end users' requirements for the fun, the usability, and the quickness of operating processes and user interfaces are getting higher.

At the present time, the opening of recently used applications in an intelligent terminal are performed by clicking on a recently used application list on the main interface, which has to unlock before entering the main interface and the recently used application list can be seen, and therefore has a poor user experience.

SUMMARY

The present disclosure provides a method and a mobile terminal for quickly opening an application based on a lock screen. When the mobile terminal is in a lock screen state, a recently used application list for a user to select an application to be opened is displayed after a touch position is detected to have been touched, so as to realize the quick open of recently used applications in the lock screen state, which increases the easiness and the fun of operation, and therefore improve the user experience.

A first technical scheme adopted by the present disclosure is to provide a mobile terminal including a communication bus as well as a processor and a storage connected to the communication bus. The storage stores a program, and the program is utilized to: display a touch position on a first area of a lock screen interface when a mobile terminal enters a lock screen, wherein the touch position is utilized to prompt whether to display a recently used application list, the application list includes at least two application icons; detect whether the touch position is touched, and if so, display a part of the application icons on a second area of the lock screen interface, and the application icons are displayed on the second area in a rotatable manner; and detect whether one of the at least two application icons is selected, and if so, further determine whether a password is required to input, and if not, open the application corresponding to the selected application icon, and if so, display a password input interface and open an application corresponding to the selected application icon after a user enters a correct password.

In one embodiment, the second region is an arcuate region.

In one embodiment, the program is further utilized to detect a distance which a user's finger pressing and sliding on the displayed application icon, and update the display of the application icon when the distance is greater than a threshold value.

A second technical scheme adopted by the present disclosure is to provide a mobile terminal including a communication bus as well as a processor and a storage connected to the communication bus. The storage stores a program, and the program is utilized to: display a touch position on a first area of a lock screen interface when a mobile terminal enters a lock screen, wherein the touch position is utilized to prompt whether to display a recently used application list, the application list includes at least two application icons; detect whether the touch position is touched, and if so, display the application list on a second area of the lock screen interface; and detect whether one of the at least two application icons is selected, and if so, open an application corresponding to the selected application icon.

In one embodiment, the program is further utilized to display a part of the application icons on the second area of the lock screen interface, wherein the application icons are displayed on the second area in a rotatable manner.

In one embodiment, the second region is an arcuate region.

In one embodiment, the program is further utilized to detect a distance which a user's finger pressing and sliding on the displayed application icon, and update the display of the application icon when the distance is greater than a threshold value.

In one embodiment, the program is further utilized to further determine whether a password is required to input after one of the at least two application icons is detected to have been selected, and if not, open the application corresponding to the selected application icon, and if so, display a password input interface and open an application corresponding to the selected application icon after a user enters a correct password.

A third technical scheme adopted by the present disclosure is to provide a method for quickly opening an application based on a lock screen including:

Displaying a touch position on a first area of a lock screen interface when a mobile terminal enters the lock screen, wherein the touch position is utilized to prompt whether to display a recently used application list, the application list including at least two application icons;

Detecting whether the touch position is touched, and if so, displaying the application list on a second area of the lock screen interface; and Detecting whether at least one of the at least two application icons is selected, and if so, opening an application corresponding to the selected application icon.

In one embodiment, the displaying the application list on a second area of the lock screen interface includes:

Displaying a part of the application icons on the second area of the lock screen interface, wherein the application icons are displayed on the second area in a rotatable manner.

In one embodiment, the second region is an arcuate region.

In one embodiment, the displaying the application list on a second area of the lock screen interface further includes:

Detecting a distance which a user's finger pressing and sliding on the displayed application icon, and updating the display of the application icon when the distance is greater than a threshold value.

In one embodiment, after detecting at least one of the at least two application icons is selected, whether requiring a password is determined, and if no, the application corresponding to the selected application icon is opened; and if yes, a password input interface is displayed, the application corresponding to the selected application icon is opened after the user enters a correct password.

An advantageous effect of the present disclosure is that, in contrast to the prior art, the present disclosure is capable of utilizing the touch position to select whether to display the recently used application list when the mobile terminal is in the lock screen state. Consequently, a user can open recently used applications quickly in the lock screen state, which increases the fun, the usability, and the quickness of lock screen. In addition, since there is no necessary to increase the hardware cost and the memory consumption, the product cost advantage is improved.

DETAILED DESCRIPTION

In order to make the technical problems solved by the present disclosure, the technical solutions, and the advantages of the present disclosure more clear and understandable, the present disclosure will be described in further detail with reference to the accompanying drawings and embodiments. It is to be understood that the specific embodiments described herein are merely to illustrate the present disclosure and not intended to limit the present disclosure.

Figure 1:
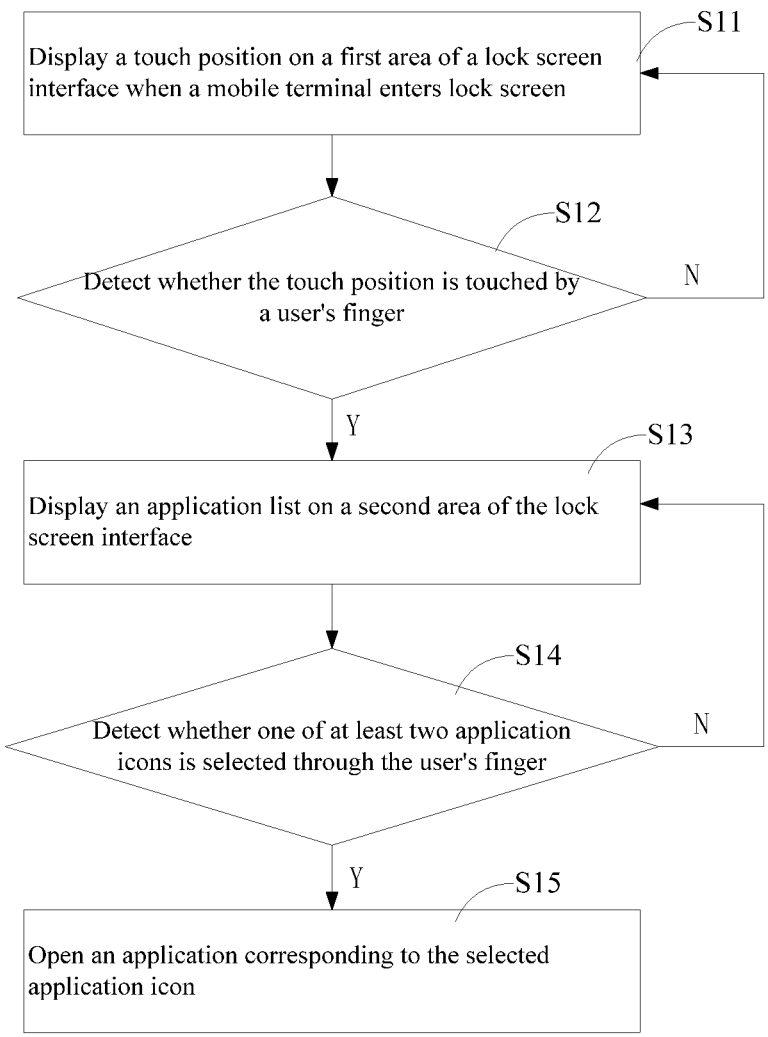
FIG. 1 is a flow chart of a first embodiment of a method for quickly opening an application based on a lock screen of the present disclosure.

Referring to FIG. 1, a flow chart of a first embodiment of a method for quickly opening an application based on a lock screen of the present disclosure is depicted. The method may include the following blocks.

At S11: displaying a touch position on a first area of a lock screen interface when a mobile terminal 1 enters the lock screen (i.e., in a lock screen state).

In one embodiment, the mobile terminal 1 includes, but is not limited to, a mobile phone, a tablet, or a personal digital assistant. Any area of the lock screen interface can be designated as the touch position. In this embodiment, the area where the touch position is located is named as the first area. The touch position is utilized to prompt whether to display a recently used application list, and the application list includes at least two application icons.

At S12: detecting whether the touch position is touched by a user's finger.

At S13: displaying the application list on a second area of the lock screen interface.

If the touch position is detected to have been touched by the user's finger, enter block S13 to display the application list on the second area of the lock screen interface. If the touch position is detected to have not been touched by the user's finger, return to block S11 to retain displaying the lock screen interface.

In one embodiment, the application list includes a part of the application icons of the mobile terminal 1, which are displayed on the second area of the lock screen interface. The application icons can be application icons corresponding to the recently used application of the user, application icons corresponding to the often used applications set by the user in advance, or all application icons in the mobile terminal 1. In addition, the application icons are displayed on the second area in a rotatable manner. Preferably, the second area is an arcuate area.

In other embodiments, other touch objects can also be used to touch the touch position.

At S14: detecting whether at least one of the at least two application icons is selected through the user's finger.

At S15: opening an application corresponding to the selected application icon.

In block S14, if it is detected that one of the application icons in the application list is touched by the user's finger or other touch objects, enter block S15 to open the application corresponding to the selected application icon. If the application icons in the application list are not detected to have been touched by the user's finger or other touch objects, return to block S13 to retain displaying the application list and display the lock screen interface after a predetermined time threshold.

As described above, basing on the lock screen of the existed mobile terminal 1, this embodiment displays the recently used application list after the touch position is detected to have been touched by the user's finger, and opens the application corresponding to the selected application icon after the user select the application icon in the application list. As a result, the quick opening of the recently used application list in a lock screen state is realized, which reduces the time consumed by unrelated operations and improves the fun, the usability, and the quickness of lock screen operations. Furthermore, since the present disclosure is developed based on the existing mobile terminal 1, the hardware cost will not be increased, and the product cost advantage is improved.

Figure 2:
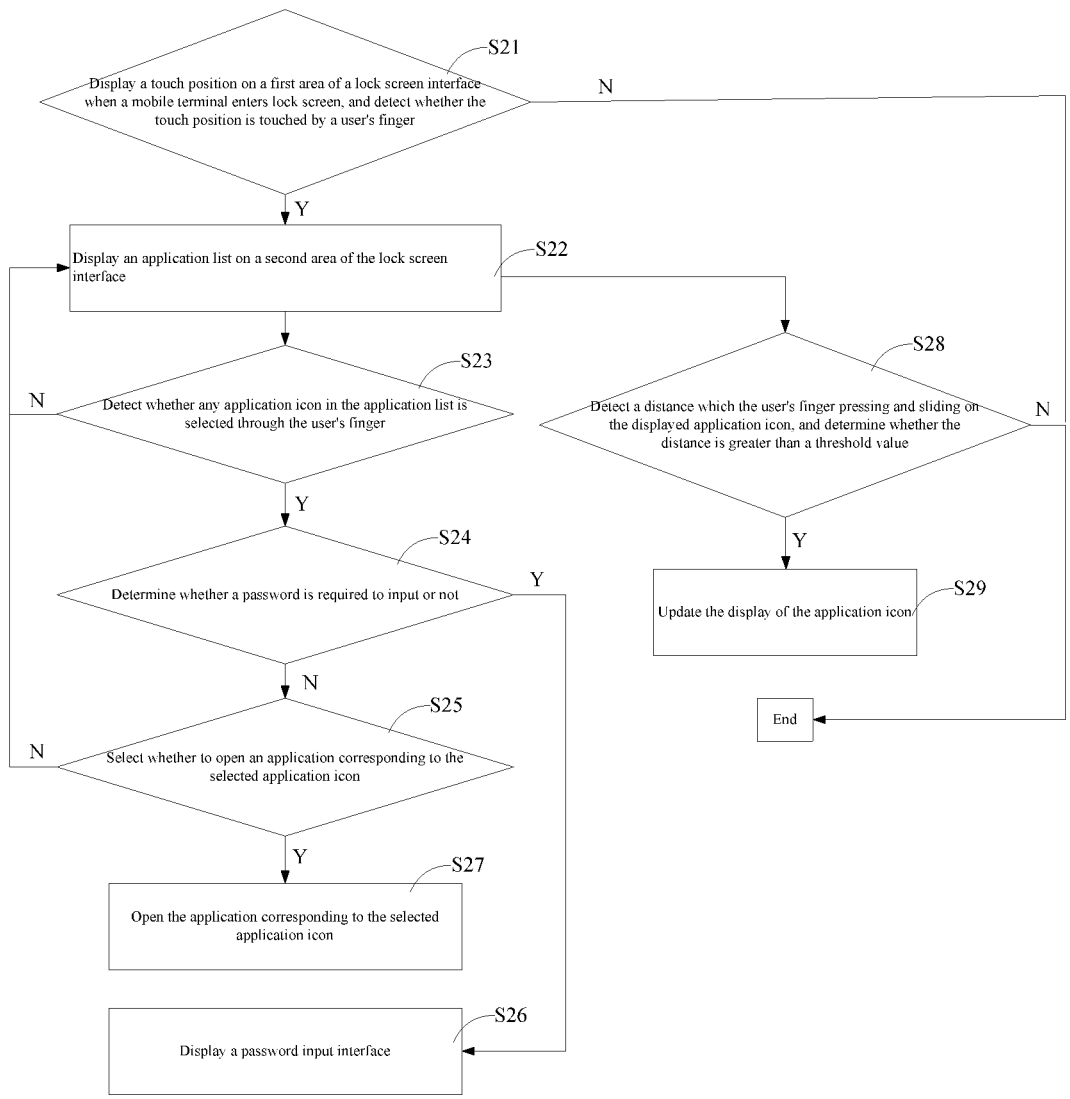
FIG. 2 is a flow chart of a second embodiment of a method for quickly opening an application based on a lock screen of the present disclosure.

Referring to FIG. 2, a flow chart of a second embodiment of a method for quickly opening an application based on a lock screen of the present disclosure is depicted. The method may include the following blocks.

At S21: displaying a touch position on a first area of a lock screen interface when the mobile terminal 1 enters the lock screen, and detecting whether the touch position is touched by a user's finger.

Figure 3:
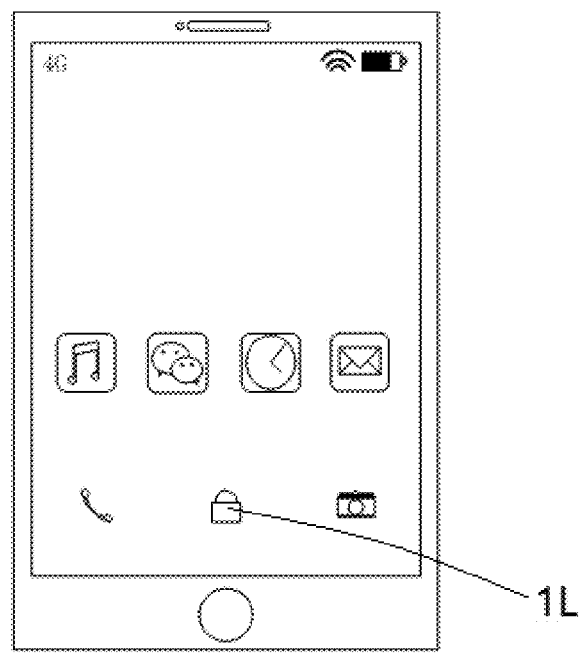
FIG. 3 is a schematic diagram of a scene of a lock screen interface of a mobile terminal of the present disclosure.

The mobile terminal 1 is preferably a mobile phone. When the mobile phone is in the lock screen state, the user makes the mobile phone to display the lock screen interface by triggering a power button of the mobile phone, and display the touch position for prompting whether to display the recently used application list on a specific area of the lock screen interface. The application list includes two or more application icons. Whether to display the application list or not is determined by detecting whether the touch position is touched by the user's finger. FIG. 3 shows displaying the touch position when the mobile terminal 1 is in the lock screen state which showing the lock screen interface. After the touch position is detected to have been touched by the user's finger, enter block S22. If the touch position is not detected to have been touched by the user's finger, the method is ended, and the mobile terminal 1 retains displaying the lock screen interface.

At S22: displaying the application list on a second area of the lock screen interface.

Figure 4:
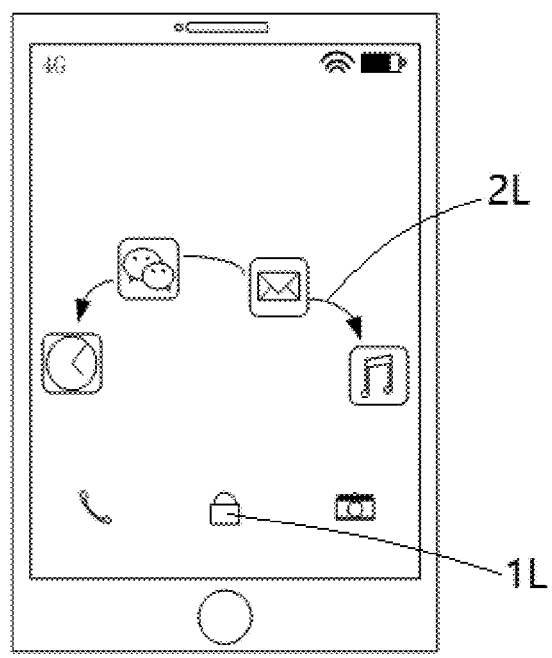
FIG. 4 is a schematic diagram of a scene of displaying a recently used application list through a mobile terminal of the present disclosure.

After the touch position is detected to have been touched by the user's finger or other touch objects, the application list is displayed on the lock screen interface. Preferably, when the touch position is long pressed by the user's finger, the application list is displayed on the lock screen interface, and when the touch position is pressed by the user's finger again, the application list is no longer displayed on the lock screen interface. The application list displays a part of the application icons of the mobile terminal 1. Preferably, the part of the application icons is the application icons corresponding to the recently used applications of the user. In addition, the application icons are displayed on the second area in a rotatable manner, and the second area is an arcuate area. Referring to FIG. 4, a schematic diagram of a scene of displaying the recently used application list through the mobile terminal 1 of the present disclosure is depicted.

In other embodiments, the application list can also be a list of often used applications set by the user, or an application list of all application in the mobile terminal 1.

At S23: detecting whether any of the application icons in the application list is selected through the user's finger.

At S24: determining whether a password is required to input or not.

At S25: selecting whether to open the application corresponding to the selected application icon.

At S26: displaying a password input interface.

A list of a part of applications is displayed on the lock screen interface of the mobile terminal 1. After any one of the application icons in the application list is detected to have been selected through the user's finger, enter block S24 to determine whether the password is required to input or not. If it is determined that the password is not required to input, enter block S25 to select whether to open the application corresponding to the selected application icon. If it is determined that the password is required to input, enter block S26 to display the password input interface, so as to prompt the user to input a correct password and enter the S25 to select whether to open the application corresponding to the selected application icon.

If it is detected that none of the application icons in the application list is selected through the user's finger, return to block S22 to retain displaying the application list on the lock screen interface. After a predetermined time threshold, only the lock screen interface is displayed, and the application list is hided until the touch position is triggered again by touching.

At S27: opening the application corresponding to the selected application icon.

In block S26, if the user selects to open the application corresponding to the selected application icon, enter block S27 to open the application corresponding to the selected application icon directly. If the user doses not select to open the application corresponding to the selected application icon, return to block S22.

In one embodiment, the method may further include the following blocks after block S22.

At S28: detecting a distance which the user's finger pressing and sliding on the displayed application icon, and determining whether the distance is greater than a threshold value.

At S29: updating the display of the application icon.

After block S22, that is, after displaying the application list on the second area of the lock screen interface, further detect the distance which the user's finger pressing and sliding on the selected application icon and determine whether the distance is greater than the threshold value. If the distance is greater than the threshold value, enter block S29 to update the display of the application icon. If the distance is smaller than the threshold value, the method is ended, and retain displaying the original application icon.

In other embodiments, in block S25, if the user selects not to open the application corresponding to the selected application icon, enter block S28.

In this embodiment, the method for quickly opening an application based on a lock screen converts the applications in the application list into components which can be recognized in lock screen, and adds a part of the components on the lock screen interface, while the remaining part of the components can be displayed after sliding reuse components by gestures. Furthermore, the corresponding applications can be opened through double-click the displayed component.

Hereinafter, an application scenario of this embodiment will be described by examples.

For instance, when the mobile phone is in the lock screen state, the lock screen interface can be displayed by clicking the power button. As shown in FIG. 3, a "lock" icon 1L is displayed on the lock screen interface; and as shown in FIG. 4, an arc-shaped application list 2L is displayed on the lock screen interface when the user's finger long presses the "lock" icon 1L, the application list presents the applications which the user recently uses. If the user selects one of the application icons to click, the application corresponding to the application icon is opened directly while the mobile phone is not configured with a password, and a password input interface for prompting the user to enter a password is popped up as well as the application corresponding to the application icon is opened after the user enters a correct password while the mobile phone is configured with a password. In addition, if the user's finger performs a sliding operation after selecting an application icon in the application list, and the distance of sliding is greater than the threshold value, for instance, when slide to the right and the distance of sliding is greater than the threshold value, the application icon displayed at the rightmost is moved to the leftmost, and the pointers of the other application icons are moved to the right by one position. Similarly, if the user slides to the left after selecting one application icon, the application icon displayed at the leftmost is moved to the rightmost, and the pointers of the other application icons are moved to the left by one position.

As described above, in this embodiment, an lock screen application can be utilized to obtain the recently used application list to store in a pending list, and update the display of the application list thorough the animation display of the lock screen interface, so that the user can select and open the recently used application. Since merely a part of the application icons are displayed, and the displayed components are reused through position calculations, the memory consumption of the mobile terminal 1 caused by a large number of components is avoided. In addition, since the hardware cost and the memory consumption will not be increased, the product cost advantage is improved. Simultaneously, the quickness, the usability, and the fun of lock screen operations are increased, which provides a brand-new operating experience to the user.

One of the pseudocodes to implement the method for quickly opening an application based on a lock screen in the above-mentioned embodiments are attached at the end of the detailed description.

Figure 5:
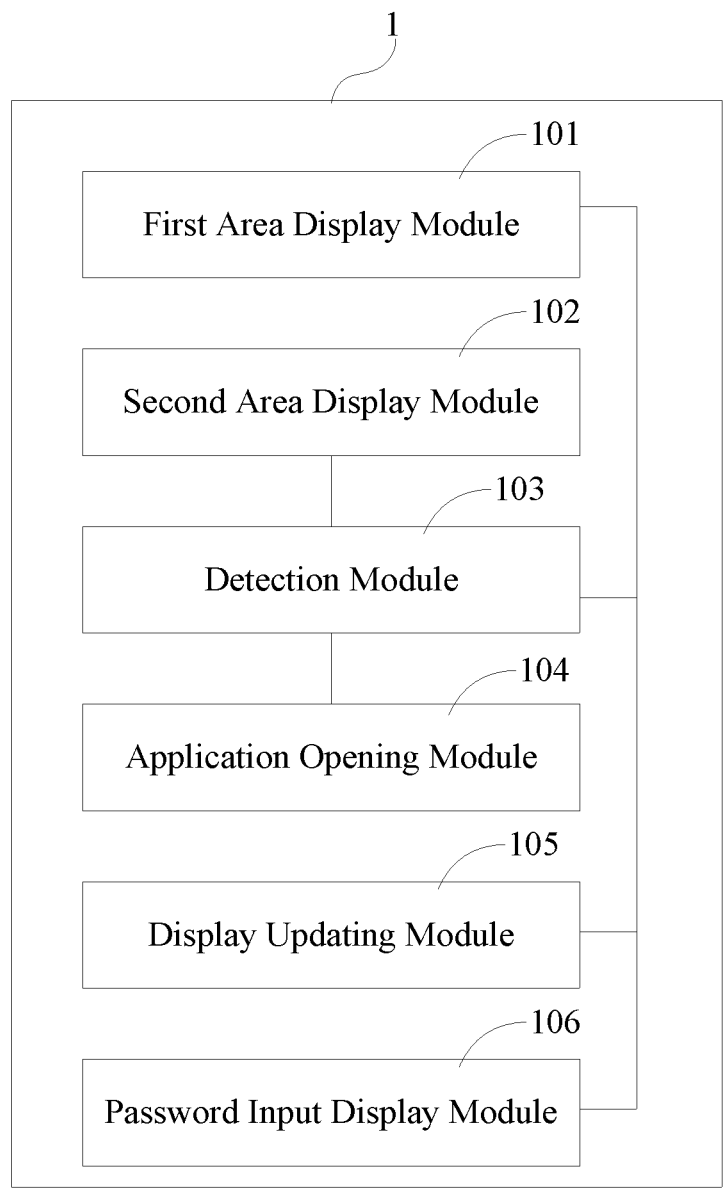
FIG. 5 is a block diagram of the structure of a mobile terminal of the present disclosure.

Referring to FIG. 5, a block diagram of the structure of the mobile terminal 1 of the present disclosure is depicted. The mobile terminal 1 includes a first area display module 101, a second area display module 102, a detection module 103, an application opening module 104, an display updating module 105, and a password input display module 106. The mobile terminal 1 is preferably a smart phone.

In one embodiment, the first area display module 101 is configured to display the touch position when the mobile terminal 1 enters the lock screen. The touch position is utilized to prompt whether to display the recently used application list. The application list includes at least two application icons, and preferably includes the application icons corresponding to five applications which the user has recently used.

The detection module 103 is configured to detect whether the touch position is touched by the user's finger, and to detect whether one of the at least two application icons is selected through the user's finger. The second area display module 102 is configured to display the application list after the detection module 103 detects that the touch position has been touched by the user's finger. The application list is displayed in an arc shape, which is displayed in a rotatable manner. The application list displays a part of the application icons of the mobile terminal 1.

The application opening module 104 is configured to open the application corresponding to the selected application icon after the detection module 103 detects that one of the at least two application icons is selected through the user's finger.

In addition, the detection module 103 is further configured to detect the distance which the user's finger pressing and sliding on the displayed application icon. The display updating module 105 is configured to update the display of the application icon when the distance is greater than the threshold value.

The password input display module 106 is configured to display the password input interface after the detection module 103 determines that a password is required to input.

Figure 6:
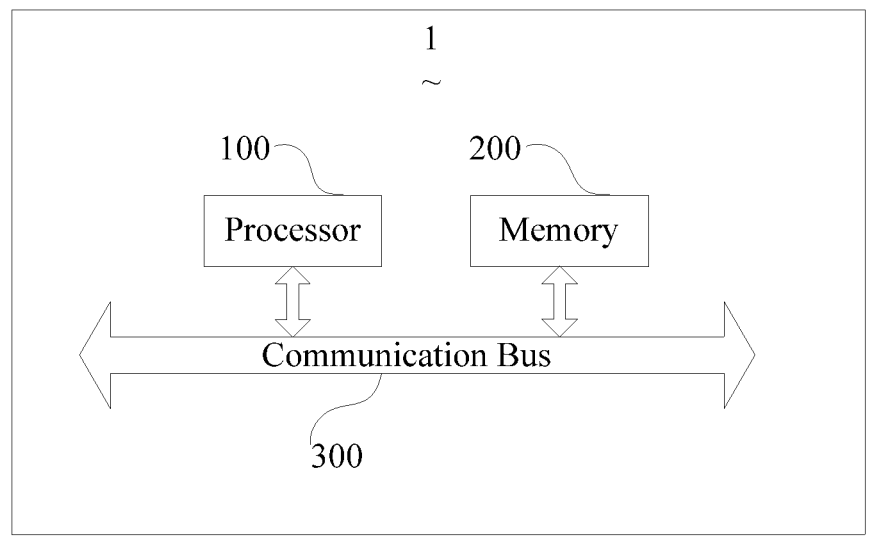
FIG. 6 is a schematic diagram of the hardware structure of a mobile terminal of the present disclosure.

Referring to FIG. 6, a schematic diagram of the hardware structure of the mobile terminal 1 of the present disclosure is depicted. The mobile terminal 1 is a smart phone. In one embodiment, the mobile terminal 1 includes a processor 100, a storage 200, and a communication bus 300. The processor 100 can be a CPU, and the storage 200 is specifically a memory or a storage space of a nonvolatile memory of the mobile terminal 1. The processor 100 is utilized to execute executable modules stored in the storage 200, for example, a computer program. The storage 200 is utilized to store programs which can be executed by the processor 100. The communication bus 300 is utilized to connect the processor 100, the storage 200, and other components of the mobile terminal 1.

In this embodiment, the program stored in the memory 200 is specifically configured to:

Display the touch position on the first area of the lock screen interface when the mobile terminal 1 enters the lock screen, wherein the touch position is utilized to prompt whether to display the recently used application list, and the application list includes at least two application icons;

Detect whether the touch position is touched by the user's finger, and if so, display the application list on the second area of the lock screen interface; and Detect whether one of the at least two application icons is selected through the user's finger, and if so, open the application corresponding to the selected application icon.

In one embodiment, the program is further configured to:
display a part of the application icons on the second area of the lock screen interface, and the application icons be displayed in a rotatable manner;

Detect the distance which the user's finger pressing and sliding on the displayed application icon, and update the display of the application icon when the distance is greater than the threshold value; and After at least one of the at least two application icons is detected to have been selected through the user's finger, further determine whether the password is required, and if not, open the application corresponding to the selected application icon, and if yes, display the password input interface and open the application corresponding to the selected application icon after the user enters a correct password.

The embodiments of the present disclosure can be embodied in the form of a software product which includes a plurality of instructions for enabling a computer device (e.g., a personal computer, a server, a network device, etc.) to execute all or a part of the method described in each of the embodiments of the present disclosure.

As described above, when the mobile terminal 1 is in the lock screen state, the recently used application list is displayed when the user touches the touch position, so that the user can select the applications in the application list and open quickly. As a result, a scheme to quickly open the recently used applications in the lock screen state is realized, which is simple in operation and improves the fun and the usability of operations. Furthermore, since the present disclosure is developed based on the existing mobile terminal 1, additional hardware is not required, hence has a great cost advantage.

The above description depicts merely some exemplary embodiments of the disclosure, but is meant to limit the scope of the disclosure. Any equivalent structure or flow transformations made to the disclosure, or any direct or indirect applications of the disclosure on other related fields, shall all be covered within the protection of the disclosure.

One embodiment of the pseudocodes to implement the method for quickly opening an application based on a lock screen in the above-mentioned embodiments is as follows:

```
@Override
protected void onLayout(boolean changed, int l, int t, int r, int b) {
    if (mItems == null || mItems.size( ) == 0) {
    // If the recently used application list is empty, not to layout
        return;
    }
    // The angle of the position to start layout
    float startAngleRadans = (float) Math.toRadians(mStartAngle);
    // Calculate the position of each icon respectively
    for (int counter = 0; counter < mChildCount; counter++){
        View view = getChildAt(counter);
    // Calculate the angle of the position of the current icon
        float resultAgree = startAngleRadans - mPerAngleToRadians * counter;
```

```
        // Calculate the x-axis coordinate of the center of the current icon
                int viewCenterX = (int) (mCentPoint.x + mRadius * Math.cos(resultAgree));
        // Calculate the position of the left border of the current icon
                int left = viewCenterX - view.getMeasuredWidth( ) / 2;
        // Calculate the position of the right border of the current icon
                int right = left + view.getMeasuredWidth( );
                if (right < 0) {
            // If the border is exceed, turn left and put the current icon in the aftermost
            // Recalculate the x-axis coordinate of the center and the position of the left and right
borders
                    resultAgree = startAngleRadans - mPerAngleToRadians * (counter +
ITEM_SHOW_NUM );
                    viewCenterX = (int) (mCentPoint.x + mRadius * Math.cos(resultAgree));
                    left = viewCenterX - view.getMeasuredWidth( ) / 2;
                    right = left + view.getMeasuredWidth( );
                } else if (left > mWidth) {
            // If the border is exceed, turn right and put the current icon in the foremost
                    // Recalculate the x-axis coordinate of the center and the position of the left
and right borders
                    resultAgree = startAngleRadans - mPerAngleToRadians * (counter -
ITEM_SHOW_NUM );
                    viewCenterX = (int) (mCentPoint.x + mRadius * Math.cos(resultAgree));
                    left = viewCenterX - view.getMeasuredWidth( ) / 2;
                    right = left + view.getMeasuredWidth( );
                }
                // Calculate the y-axis coordinate of the center
                int viewCenterY = (int) (mCentPoint.y - mRadius * Math.sin(resultAgree));
                // Calculate the position of the upper border
                int top = viewCenterY - view.getMeasuredHeight( ) / 2;
                // Calculate the position of the lower border
                int bottom = top + view.getMeasuredHeight( );
                view.layout(left,top,right,bottom);
            }
    }
}
// Calculate the x and y coordinates of the last touch
private float mLastX;
private float mLastY;
@Override
public boolean dispatchTouchEvent(MotionEvent event) {
    float x = event.getX( );
    float y = event.getY( );
    // Only rotatable when the number of the recently used applications is more than 5
    if (mItems.size( ) > 5) {
        switch (event.getAction( )) {
            case MotionEvent.ACTION_DOWN:
                mLastX = x;
                mLastY = y;
                return true;
            case MotionEvent.ACTION_MOVE:
    // Update the angle of rotation
                int tmpAngle = (int) (mStartAngle - (x - mLastX) / 5);
                mStartAngle = tmpAngle;
    // Determine whether the rotation has exceeded, that is, more than one cycle
                boolean isOutValue = Math.abs(mStartAngle -
MAX_START_ANGLE) > mAllItemAngle;
    // If more than one cycle, the excessed cycle has to be subtracted to ensure that the
cycle is between -T and T
                if (isOutValue) {
                    if (mLastX > x) {// slide to the left
                        mStartAngle -= mAllItemAngle;
                    } else {// slide to the right
                        mStartAngle += mAllItemAngle;
                    }
                }
    // Calculate the position after the current rotation
                int itemStartPosition = (int) ((mStartAngle - MAX_START_ANGLE) /
mPerAngle);
    // If the current position is different from the last position, the rotation by one icon
is happened
                if (mLastItemStartPosition != itemStartPosition) {
            // If it is left turn, the position pointer is added by one, and calculate the
remainder such that the pointer array won't be excessed
                    if (itemStartPosition - mLastItemStartPosition == 1)
{
                        mImageViewStartNum ++;
                        mImageViewStartNum %= ITEM_SHOW_NUM;
                        changeItem4ImageView(1);
            //// If it is right turn, the position pointer is subtracted by one, and calculate the
remainder such that the pointer array won't be excessed
```

```
                } else if (mLastItemStartPosition - itemStartPosition == 1) {
                    mImageViewStartNum --;
                    mImageViewStartNum =
(mImageViewStartNum + ITEM_SHOW_NUM) % ITEM_SHOW_NUM;
                    changeItem4ImageView(-1);
                }
            }
            // Record the current position
                mLastItemStartPosition = itemStartPosition;
                // Re-layout
                requestLayout( );
                mLastX = x;
                mLastY = y;
                return true;
            case MotionEvent.ACTION_UP:
                break;
        }
    }
    return super.dispatchTouchEvent(event);
}
    private int mFirstChild = 0;
    private int mLastChild = ITEM_SHOW_NUM - 1;
    private int mFirstChildItemPosition = 0;
    private int mLastChildItemPosition = ITEM_SHOW_NUM - 1;
// itemStartPosition: 1 represents left turn, -1 represents right turn
    private synchronized void changeItem4ImageView(int itemStartPosition) {
    // Move the front pointer to obtain the position of the latest icon
        mFirstChildItemPosition = (mFirstChildItemPosition + itemStartPosition +
mItems.size( )) % mItems.size( );
    // Move the back pointer to obtain the position of the latest icon
        mLastChildItemPosition  =  (mLastChildItemPosition  +  itemStartPosition  +
mItems.size( )) % mItems.size( );
        if (itemStartPosition > 0) {
    // If turn to the left, put the forefront component in the aftermost
            ImageView view = (ImageView) getChildAt(mFirstChild);
            RecAppsItem item =mItems.get(mLastChildItemPosition);
            view.setImageDrawable(item.icon);
        } else {
    // If turn to the right, put the aftermost component in the forefront
            ImageView view = (ImageView) getChildAt(mLastChild);
            RecAppsItem item = mItems.get(mFirstChildItemPosition);
            view.setImageDrawable(item.icon);
        }
        // Update the position of the component pointer
        mFirstChild = (mFirstChild + itemStartPosition + ITEM_SHOW_NUM) %
ITEM_SHOW_NUM;
        mLastChild = (mLastChild + itemStartPosition + ITEM_SHOW_NUM) %
ITEM_SHOW_NUM;
    }
```

What is claimed is:

1. A mobile terminal, wherein the mobile terminal comprises a communication bus and a processor and a storage connected to the communication bus, the storage stores a program, the program is utilized to:
   display a touch position on a first area of a lock screen interface when a mobile terminal enters a lock screen, wherein the first area is a designated area of the lock screen interface, the touch position is utilized to prompt whether to display an application list, the application list comprises at least two application icons;
   detect whether the touch position is touched, if so, display a part of the at least two application icons on a second area of the lock screen interface, and the application icons are displayed on the second area in a rotatable manner; if the touch position is not touched, retain displaying the lock screen interface; and
   detect whether one of the at least two application icons is selected, and if so, further determine whether a password is required to input, and if not, open the application corresponding to the selected application icon, and if so, display a password input interface and open an application corresponding to the selected application icon after a user enters a correct password;
   wherein, the program is further utilized to detect a distance of a touch pressing and sliding on the selected one of the at least two application icons, and update the displayed position of the selected one of the at least two application icons when the distance is greater than a threshold value by operations of:
   if the touch slides to the right and the distance is greater than the threshold value, moving an application icon displayed at the rightmost to the leftmost, and moving pointers of the other application icons to the right by one position; if the touch slides to the left and the distance is greater than the threshold value, moving an application icon displayed at the leftmost to the rightmost, and moving pointers of the other application icons to the left by one position.

2. The mobile terminal of claim 1, wherein the second area is an arcuate area.

3. A mobile terminal, wherein the mobile terminal comprises a communication bus and a processor and a storage connected to the communication bus, the storage stores a program, the program is utilized to:
   display a touch position on a first area of a lock screen interface when a mobile terminal enters a lock screen, wherein the first area is a designated area of the lock screen interface, the touch position is utilized to prompt whether to display an application list, and the application list comprises at least two application icons;

detect whether the touch position is touched, if so, display the application list on a second area of the lock screen interface; if the touch position is not touched, retain displaying the lock screen interface; and detect whether one of the at least two application icons is selected, and if so, open an application corresponding to the selected application icon;

wherein, the program is further utilized to detect a distance of a touch pressing and sliding on the selected one of the at least two application icons, and update the displayed position of the selected one of the at least two application icons when the distance is greater than a threshold value by operations of:

if the touch slides to the right and the distance is greater than the threshold value, moving an application icon displayed at the rightmost to the leftmost, and moving pointers of the other application icons to the right by one position; if the touch slides to the left and the distance is greater than the threshold value, moving an application icon displayed at the leftmost to the rightmost, and moving pointers of the other application icons to the left by one position.

4. The mobile terminal of claim 3, wherein the program is further utilized to display a part of the at least two application icons on the second area of the lock screen interface, wherein the at least two application icons are displayed on the second area in a rotatable manner.

5. The mobile terminal of claim 3, wherein the second area is an arcuate area.

6. The mobile terminal of claim 3, wherein the program is further utilized to further determine whether a password is required to open an application corresponding to the selected one of the at least two application icons, open the application if no password is required, and if the password is required, display a password input interface and open the application after the password is entered.

7. A method for opening an application based on a lock screen, the method comprising:

displaying a touch position on a first area of a lock screen interface when a mobile terminal enters the lock screen, wherein the first area is a designated area of the lock screen interface, the touch position is utilized to prompt whether to display an application list, the application list comprising at least two application icons;

detecting whether the touch position is touched, if so, displaying the application list on a second area of the lock screen interface; if the touch position is not touched, retain displaying the lock screen interface; and detecting whether at least one of the at least two application icons is selected, and if so, opening an application corresponding to the selected one of the at least two application icons;

wherein the method further comprises:

detecting a distance of a touch pressing and sliding on the selected one of the two application icons, and updating the displayed position of the selected one of the two application icons when the distance is greater than a threshold value by operations of:

if the touch slides to the right and the distance is greater than the threshold value, moving an application icon displayed at the rightmost to the leftmost, and moving pointers of the other application icons to the right by one position; if the touch slides to the left and the distance is greater than the threshold value, moving an application icon displayed at the leftmost to the rightmost, and moving pointers of the other application icons to the left by one position.

8. The method of claim 7, wherein the displaying the application list on a second area of the lock screen interface comprises:

displaying a part of the application icons on the second area of the lock screen interface, wherein the application icons are displayed on the second area in a rotatable manner.

9. The method of claim 7, wherein the second area is an arcuate area.

10. The method of claim 7, further comprising after detecting whether at least one of the at least two application icons is selected, determining whether a password is required, and if the password is not required, the application corresponding to the selected application icon is opened; and if the password is required, displaying a password input interface, and opening the application corresponding to the selected one of the at least two application icons after the password is entered.

11. The mobile terminal of claim 1, wherein the touch position is touched by a finger of a user.

12. The mobile terminal of claim 1, wherein the program is further utilized to display the application list on the second area of the lock screen interface when the at least two application icons in the application list are not detected to have been touched to retain displaying the application list and display the lock screen interface after a predetermined time threshold.

13. The mobile terminal of claim 3, wherein the touch position is touched by a finger of a user.

14. The mobile terminal of claim 6, wherein the program is further utilized to display the application list on the second area of the lock screen interface when the at least two application icons in the application list are not detected to have been touched to retain displaying the application list and display the lock screen interface after a predetermined time threshold.

15. The mobile terminal of claim 7, wherein the touch position is touched by a finger of a user.

16. The mobile terminal of claim 10, further comprising displaying the application list on the second area of the lock screen interface when the at least two application icons in the application list are not detected to have been touched to retain displaying the application list and display the lock screen interface after a predetermined time threshold.

* * * * *